(12) United States Patent
Henderson et al.

(10) Patent No.: US 11,889,824 B2
(45) Date of Patent: Feb. 6, 2024

(54) FISHING LURE

(71) Applicants: Scott A. Henderson, Costa Mesa, CA (US); Daniel P. Maiman, Aliso Viejo, CA (US)

(72) Inventors: Scott A. Henderson, Costa Mesa, CA (US); Daniel P. Maiman, Aliso Viejo, CA (US)

( * ) Notice: Subject to any disclaimer, the term of this patent is extended or adjusted under 35 U.S.C. 154(b) by 7 days.

(21) Appl. No.: 17/126,723

(22) Filed: Dec. 18, 2020

(65) Prior Publication Data

US 2022/0192168 A1    Jun. 23, 2022

(51) Int. Cl.
*A01K 85/14* (2006.01)
*A01K 85/18* (2006.01)
*A01K 85/00* (2006.01)
*A01K 85/01* (2006.01)

(52) U.S. Cl.
CPC ............ *A01K 85/14* (2013.01); *A01K 85/011* (2022.02); *A01K 85/029* (2022.02); *A01K 85/18* (2013.01)

(58) Field of Classification Search
CPC ...... A01K 85/18; A01K 85/14; A01K 85/029; A01K 85/00; A01K 85/011; A01K 85/012; A01K 85/013
USPC ....... 43/42, 42.5, 42.09, 42.32, 42.33, 42.34
See application file for complete search history.

(56) References Cited

U.S. PATENT DOCUMENTS

| | | | | |
|---|---|---|---|---|
| 1,740,335 A * | 12/1929 | John | ...................... | A01K 85/16 43/42.17 |
| 2,618,096 A * | 11/1952 | Wagner | .................. | A01K 85/16 43/42.3 |
| 2,764,834 A * | 10/1956 | Klein | ..................... | A01K 85/16 43/42.09 |
| 2,862,752 A * | 12/1958 | Heppner | ................. | E05C 19/16 335/285 |
| 3,009,225 A * | 11/1961 | Budreck | ............... | H01F 7/0252 24/303 |
| 3,015,904 A * | 1/1962 | Trani | ..................... | A01K 85/14 43/42.32 |
| 3,041,697 A * | 7/1962 | Budreck | .............. | A44B 15/002 24/303 |
| 3,111,736 A * | 11/1963 | Budreck | .............. | A44B 15/002 70/459 |
| 3,277,681 A * | 10/1966 | Bey | ...................... | A44B 15/002 24/303 |
| 3,408,764 A * | 11/1968 | Mccurry | ................ | A01K 85/16 43/42.09 |
| 3,505,754 A * | 4/1970 | Lawlor | .................. | A01K 85/16 43/42.22 |
| 3,913,257 A * | 10/1975 | Colgan | .................. | A01K 85/16 43/42.09 |
| 4,047,317 A * | 9/1977 | Pfister | .................... | A01K 85/01 43/42.06 |

(Continued)

FOREIGN PATENT DOCUMENTS

WO    WO-2006137103 A1 *  12/2006    ............ A01K 85/16

*Primary Examiner* — Darren W Ark
*Assistant Examiner* — Zoe Tam Tran
(74) *Attorney, Agent, or Firm* — Kenyon Jenckes

(57) ABSTRACT

A fishing lure that includes magnetizable, exchangeable plates on the dorsal and ventral surface of the lure. A magnet is provided within the lure body for releasable attraction of various plates to the top and bottom surface of the lure. The elongate body allows for placement of different plates within the single elongate body, thus changing the look of the lure.

8 Claims, 2 Drawing Sheets

(56) References Cited

U.S. PATENT DOCUMENTS

| | | | | |
|---|---|---|---|---|
| 4,401,961 | A * | 8/1983 | Baermann | H01F 7/0252 335/305 |
| 5,887,377 | A * | 3/1999 | Birko | A01K 85/02 43/37 |
| 5,934,007 | A * | 8/1999 | Ellestad | A01K 85/16 43/42.5 |
| 9,814,223 | B2 * | 11/2017 | Jarvis, III | A01K 85/16 |
| 10,321,668 | B1 * | 6/2019 | Cornelison | A01K 85/00 |
| 2010/0205849 | A1 * | 8/2010 | Choi | A01K 85/01 43/42.35 |
| 2011/0289737 | A1 * | 12/2011 | Ninomiya | H01F 7/0263 24/303 |
| 2013/0097817 | A1 * | 4/2013 | Hayton | A44B 11/06 24/303 |
| 2014/0190064 | A1 * | 7/2014 | Fellbaum | A01K 85/01 43/42.09 |
| 2015/0075058 | A1 * | 3/2015 | Stecher | A01K 85/14 43/42.31 |

\* cited by examiner

FISHING LURE

FIELD OF THE INVENTIONS

The inventions described below relate to the field of fishing lures with releasable plates that can be changed to vary the look of the lure.

BACKGROUND OF THE INVENTIONS

A fishing lure is a type of artificial fishing bait that is intended to attract a fish's attention. Fish are naturally attracted to the live bait, but the lure is a substitute used by fisherman to catch fish. The fisherman controls and manipulates movement of the lure to attract the fish. The fishing lure is tied to the fishing line, which is connected to a fishing reel and rod. Fishermen reel in the fishing line, sweep the fishing rod, or let out line to manipulate the motion of the lure. The desire to effectively attract fish requires use of multiple different types of lures. This results in the constant replacing of the lures depending on the fishing conditions. Consequently, there is a need for a single lure body that can cheaply and easily provide removable and replaceable plates for different looks in order to more effectively attract fish.

SUMMARY

The devices and methods described below provide for a fishing lure that contains removable and replaceable plates. A single body includes a magnet within the lure body for releasable attraction of various plates to the top and bottom surface of the lure. The elongate body allows for placement of different plates within the single elongate body, thus changing the look of the lure. Each plate is shaped to fit within a beveled recess with the top and bottom surfaces of the lure body of each surface within the elongate body. The plates may be any color or include various ornamental or functional indicia on the plate to allow a user to select from a variety of plate styles for interchangeable use with the single housing. A single lure base can achieve multiple different looks merely by placing different plates sets which is economical for the user.

DETAILED DESCRIPTION OF THE INVENTIONS

Figure 1:
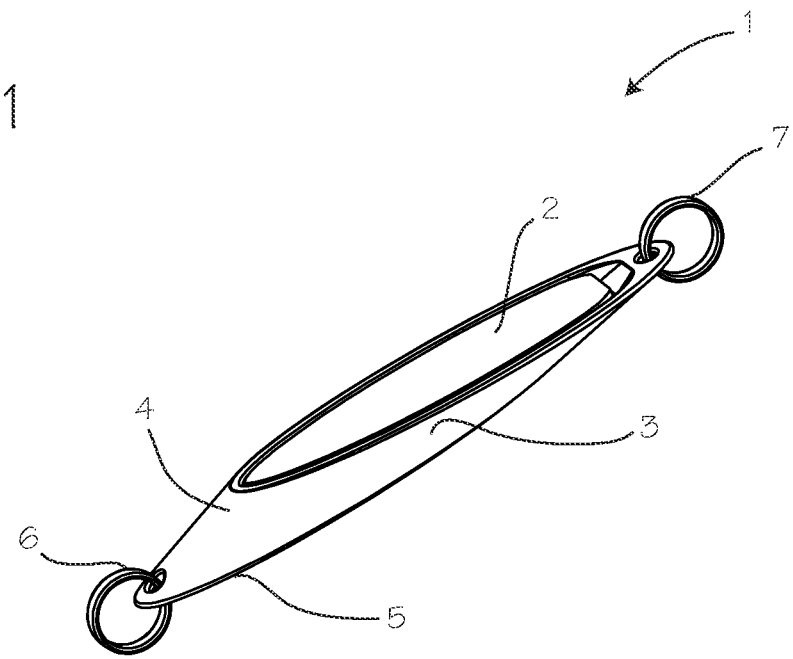
FIG. 1 illustrates a fishing lure with releasable plates.

FIG. 1 illustrates a fishing lure 1 with one or more releasable plates 2. The fishing lure includes an elongate body 3 that is roughly fish-shaped with a corresponding analogous dorsal surface 4 and ventral surface 5. The elongate body also includes a first end having a ring 6 adapted to be attached to a fishing line and a second end having a second ring 7 adapted to be attached to at least one hook (not shown). The dorsal surface and ventral surface each house a releasable plate.

Figure 2:
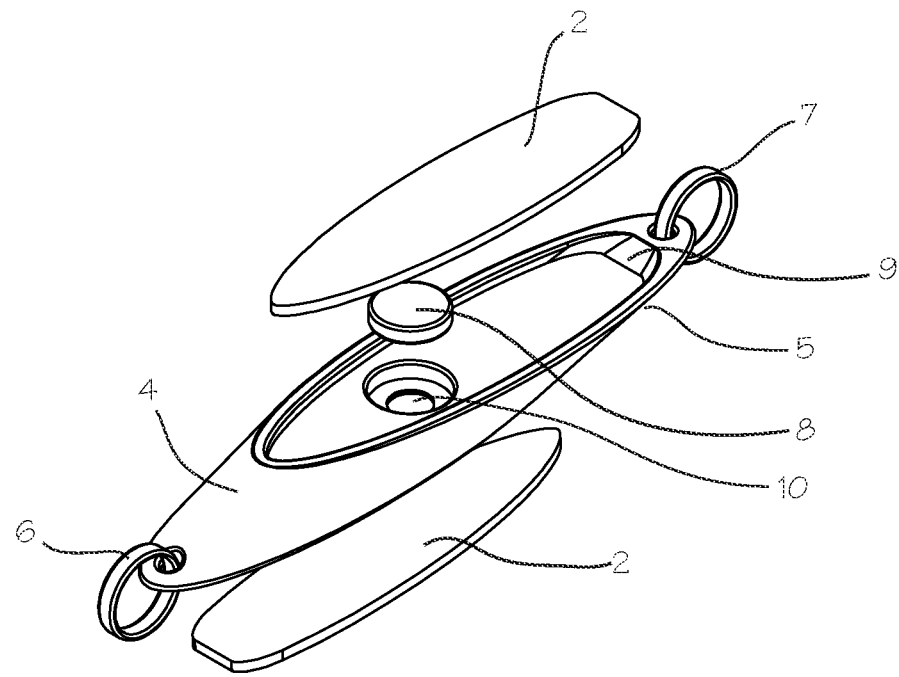
FIG. 2 is an exploded sectional view of the fishing lure with the releasable plates and its component parts.

FIG. 2 is exploded sectional view of the fishing lure and its component parts. The figure illustrates the various parts of the fishing lure and includes a magnet 8 within the lure elongate body. The elongate body 3 includes a dorsal top surface 4 and a ventral surface 5. Both the dorsal surface and ventral surface have a recess 9 within the surface. The recess may be beveled. The recess has a more pronounced slant at one end of the recess and tapers to a smaller slant at the opposite end. The recess must be deeper than the plate thickness, at least at one end, so that the depression of the plate into the recess results in lifting of the opposite end of the plate. The elongate body may include a recess or through hole 10 configured to house a magnet therein. The magnet may be contained within the recess for magnetic connection of each plate within the dorsal surface and ventral surface. Alternatively, the dorsal surface and the ventral surface may include a magnetic surface to magnetically attract the plates. The elongate body allows for placement of different plates within the single elongate body, thus changing the look of the lure. Each plate is shaped to fit within the recess of each surface within the elongate body. The plates may be any color or include various ornamental or functional indicia on the plate to allow a user to select from a variety of plate styles for use within a single housing. This allows the aesthetic or functional look of the lure to be changed according to fishing conditions or user requirements. The elongate body also has a first end and a second end. The first end contains a first ring 6 for connecting at least one hook and the second end contains a second ring 7 to attach the lure to a fishing line.

Figure 3:
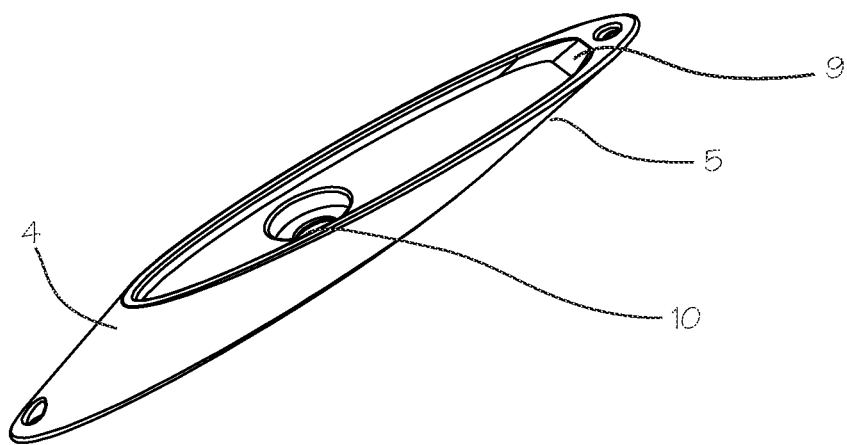
FIG. 3 is a view of the fishing lure without the plates or rings shown in FIGS. 1 and 2.

FIG. 3 illustrates the elongate body without the plates or rings. The dorsal surface 4 and ventral surface 5 include a recess 9 within each surface. The recess is more pronounced at one end and tapers to a lesser slant at the opposite end and is deeper than the plate thickness, at least at one end. The elongate body may further include a hole 10 that extends from the dorsal surface through the ventral surface to house a magnet. The recessed surface allows for user to place interchangeable plates within the recesses on the dorsal surface and the ventral surface and remove the plates without the assistance of a tool. Moreover, the plates can be interchanged without retying or removing the lure body from the line, and instead plates may be changed with the lure in position. The plates are made of any material that securely, but releasably, attracts to a magnet. In addition, replacement of only the lure plates with a single elongate body provides economical savings to the user.

Figure 4:
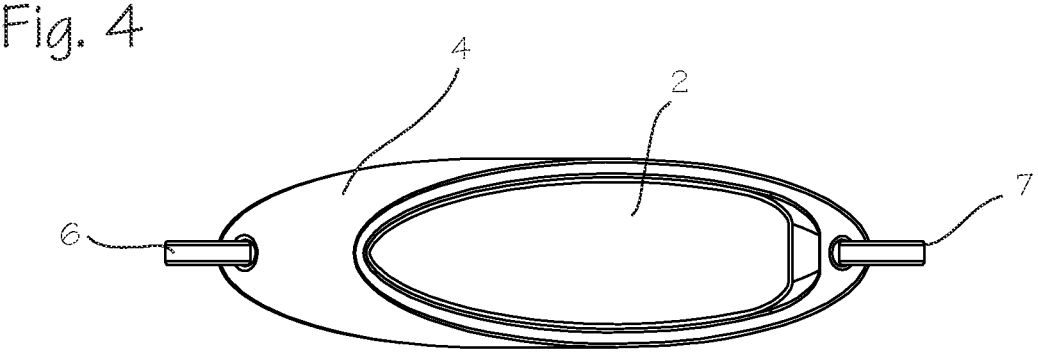
FIG. 4 is a top view of the fishing lure of FIG. 1.

FIG. 4 is a top view of the fishing lure of FIG. 1. The figure illustrates what the dorsal plate look like within the dorsal surface of the elongate body. The dorsal plate is inserted within a beveled recess in the dorsal surface. The plate can include be any color and can include visual or functional indicia that may be attractive to fish.

In use, a user positions a first plate within the dorsal surface and a second plate within the ventral surface of the housing in order to engage the plates with the magnet, or magnetic surface, to be releasably secured within the body. The plates are secure enough to remain within the body while the lure is in the water. However, the plates are easily changed for other colored plates or plates with other preferred visual indicia. The varied slant of the beveled recess allows for placement of each plate into the dorsal or ventral surface for strong magnetic connection to the magnet but also allows for ease of removal of the plate from the elongate body. Specifically, a user can remove the plate merely by insertion of a finger at the end of the beveled recess. A user can easily remove and replace the plates within the recess without the use of any tool. The recess allows easier release of the plate while still maintaining proper attraction between the plates and the magnet. When the desired plates are placed on the dorsal and ventral surfaces, the fishing lure is attached at one end to at least one hook and at the opposite end to the fishing line. Advantageously, the plates can be interchanged without re-tying or removing the lure body from the line. The lure is used to attract fish by reflecting light and moving randomly through the water. The lure is moved by winding the line back to the reel and is adjusted by the user to catch fish.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A fishing lure comprising:
   an elongate body including
      a dorsal surface having an area and including a first recess having a front end, a rear end, and a flat planar inner surface, the first recess having an area greater than 50% of the area of the dorsal surface and include a first end and a second end,
      a ventral surface having an area and including a second recess having a flat planar inner surface, the second recess having an area greater than 50% of the area of the ventral surface, and
      a magnet recess extending between the first recess inner surface and the second recess inner surface and having an opening located in the first recess inner surface,
   a magnet shaped to fit in the magnet recess such that no portion of the magnet extends beyond the opening in the first recess inner surface;
   a first plate having a front end corresponding to the front end of the first recess, a rear end corresponding to the rear end of the first recess, and a flat planar bottom surface, the first plate being configured to form a releasable magnetic attachment to at least a portion of the first recess inner surface via the magnet and a shape corresponding to the shape of the first recess, wherein the first plate has a length less than a length of the first recess such that a portion of the first recess is exposed adjacent the rear end of the first plate when the first plate is attached to at least the portion of the first recess inner surface; and
   a second plate configured to form a releasable magnetic attachment to the second recess inner surface via the magnet and a shape corresponding to the shape of the second recess.

2. The fishing lure of claim 1, wherein the elongate body includes a first end and a second end, and further comprising a first ring at the first end of the elongate body.

3. The fishing lure of claim 2 further comprising a second ring at the second end of the elongate body.

4. The fishing lure of claim 1 wherein the first and second plates each include a top surface having a first color.

5. The fishing lure of claim 1 wherein the first recess is beveled.

6. The fishing lure of claim 1 wherein the second recess is beveled.

7. The fishing lure of claim 4, further comprising:
   a first replacement plate having a flat planar bottom surface configured to be releasably attached to the first recess inner surface via the magnet; and
   a second replacement plate configured to be releasably attached to the second recess inner surface via the magnet, wherein the first replacement plate and the second replacement second plate each include a top surface having a second color different than the first color.

8. The fishing lure of claim 1, wherein each of the first plate and the second plate include a smooth top surface.

* * * * *